(12) United States Patent
Cassetta et al.

(10) Patent No.: US 12,440,309 B2
(45) Date of Patent: Oct. 14, 2025

(54) CAD/CAM SURGICAL DEVICE AND USE THEREOF

(71) Applicant: UNIVERSITA' DEGLI STUDI DI ROMA "LA SAPIENZA", Rome (IT)

(72) Inventors: Michele Cassetta, Rome (IT); Federica Altieri, Rome (IT)

(73) Assignee: UNIVERSITA' DEGLI STUDI DI ROMA "LA SAPIENZA", Rome (IT)

( * ) Notice: Subject to any disclaimer, the term of this patent is extended or adjusted under 35 U.S.C. 154(b) by 225 days.

(21) Appl. No.: 17/794,688

(22) PCT Filed: Jan. 22, 2021

(86) PCT No.: PCT/IB2021/050498
§ 371 (c)(1),
(2) Date: Jul. 22, 2022

(87) PCT Pub. No.: WO2021/149001
PCT Pub. Date: Jul. 29, 2021

(65) Prior Publication Data
US 2023/0038183 A1    Feb. 9, 2023

(30) Foreign Application Priority Data
Jan. 24, 2020   (IT) .................. 102020000001426

(51) Int. Cl.
*A61C 1/08*     (2006.01)
*A61C 3/03*     (2006.01)
*A61C 7/00*     (2006.01)

(52) U.S. Cl.
CPC .............. *A61C 7/002* (2013.01); *A61C 1/082* (2013.01); *A61C 3/03* (2013.01)

(58) Field of Classification Search
CPC ................................. A61C 1/082; A61C 1/084
See application file for complete search history.

(56) References Cited

U.S. PATENT DOCUMENTS

| | | | |
|---|---|---|---|
| 2008/0102415 A1* | 5/2008 | Scott | A61C 1/084 433/24 |
| 2013/0296872 A1* | 11/2013 | Davison | A61B 17/152 606/87 |
| 2014/0088597 A1* | 3/2014 | Dibart | A61B 17/142 606/79 |

(Continued)

FOREIGN PATENT DOCUMENTS

| | | | | |
|---|---|---|---|---|
| CN | 107714200 A | * | 2/2018 | ............. A61C 1/082 |
| EP | 2 792 329 | | 10/2014 | |

(Continued)

OTHER PUBLICATIONS

Hou, H (2019). A novel 3D-printed computer assisted piezocision guide for surgically facilitated orthodontics, American Journal of Orthodontics and Dentaofacial Orthopedics, 155(4), 584-591. https://www.ajodo.org/article/S0889-5406(18)31116-8/fulltext (Year: 2019).*

(Continued)

*Primary Examiner* — Heidi M Eide

(57) ABSTRACT

The present invention concerns a surgical device made by computer-aided design and manufacturing (CAD/CAM) and its use as a surgical guide.

17 Claims, 2 Drawing Sheets

(56) References Cited

U.S. PATENT DOCUMENTS

| | | | | |
|---|---|---|---|---|
| 2015/0265372 A1* | 9/2015 | Kim | ............... | A61C 13/08 433/214 |
| 2015/0272598 A1* | 10/2015 | Dubois | ............... | A61B 17/176 |
| 2017/0209235 A1 | 7/2017 | Fisker et al. | | |
| 2019/0105130 A1* | 4/2019 | Grove | ............... | A61C 7/002 |
| 2019/0314127 A1* | 10/2019 | Chen | ............... | A61B 17/176 |
| 2019/0336245 A1* | 11/2019 | Liacouras | ............... | A61C 13/0004 |
| 2020/0281655 A1* | 9/2020 | Cen | ............... | B29C 64/393 |
| 2021/0059691 A1* | 3/2021 | Zille | ............... | A61B 17/15 |

FOREIGN PATENT DOCUMENTS

| | | | | | |
|---|---|---|---|---|---|
| FR | 2881943 A1 | * | 8/2006 | ............ | A61B 17/176 |
| GB | 2513148 A | * | 10/2014 | ............ | A61C 1/084 |
| KR | 20130126025 A | * | 11/2013 | ............ | A61C 3/12 |
| WO | WO-2019106622 A1 | * | 6/2019 | ............ | A61C 1/084 |
| WO | WO-2019171381 A1 | * | 9/2019 | ............ | A61B 90/361 |

OTHER PUBLICATIONS

Defintion of odontostomatologica from https://www.proz.com/kudoz/italian-to-english/medical-general/2174803-odontostomatologica.html (Year: 2024).*

International Search Report issued by the EPO on Mar. 19, 2021 for International patent application No. PCT/IB2021/050498.

Database Medli NE [Online] US National Library of Medici NE ( N LM), Bethesda, MD, US; Apr. 2019 (Apr. 2019), Hou Hsin-Yu et al: A novel 3D-printed computer-assisted piezocision guide for surgically facilitated orthodontics. 11, XP002800207, Database accession No. NLM30935613 the whole document.

& American Journal of Orthodontics and Dentofacial Orthopedics : Official Publication of the American Association of Orthodontists, Its Constituent Societies, and the American Board of Orthodontics Apr. 2019, vol. 155, No. 4, Apr. 2019 (Apr. 2019), pp. 584-591, ISSN: 1097-6752.

* cited by examiner

CAD/CAM SURGICAL DEVICE AND USE THEREOF

This application is a U.S. national stage of PCT/IB2021/050498 filed on 22 Jan. 2021, which claims priority to and the benefit of Italian Patent Application No. 102020000001426, filed 24 Jan. 2020 the contents of which are incorporated herein by reference in their entireties.

The present invention concerns a surgical device made by computer-aided design and manufacturing (CAD/CAM) and its use as a surgical guide.

KNOWN ART

Orthodontics is the dental art dealing with the study, diagnosis and therapy of the abnormal position of one or more dental elements, aligning poorly positioned teeth and/or modulating the growth of jaw bones, such as to obtain proper chewing, improved oral hygiene and improved smile aesthetics. In order to reach such results, the person subjected to orthodontic treatment is subjected to the use of fixed or removable dental braces, depending on the case.

However, as is known, orthodontic treatments can be invasive, painful and can also often be prolonged over time, since it may take several years to successfully complete the treatment.

The long times of the traditional orthodontic treatment are often dictated by the presence of the cortical bone. Thus, in order to significantly reduce the times of the traditional orthodontic treatment, and to simultaneously improve its efficacy, a simple and fast surgical technique, called dentoalveolar corticotomy, which provides for the incising and weakening of the cortex, was developed.

Dentoalveolar corticotomy procedure is currently a valid therapeutic option in the orthodontic treatment of the adult patient. In fact, such technique has allowed to overcome the main limitations of traditional orthodontics in adult patients, such as for example: absence of the growth factor, reduced dental mobility, possible periodontal complications and prolonged duration of therapy. It was shown that corticotomy accelerates the orthodontic movement of teeth, thus consequently reducing the times necessary to be able to consider the orthodontic treatment successfully completed. The corticotomy-assisted orthodontic treatment (CAOT) is implemented through small perforations on the cortex of the alveolar bones which allow an acceleration of the orthodontic movement. According to some hypotheses, the accelerated movement of teeth following corticotomy could be due to the induction of a more intense osteoclastic activity, resulting in osteopenia and increased bone remodeling.

However, corticotomy is any case an invasive procedure due to the necessary raising of the muco-periosteal flaps and to the significant post-operative discomfort. Piezocision, i.e. a corticotomy technique carried out with linear incisions of the mucosa, at the inter-radicular level, which allow access to the cortical bone without raising the periosteal flaps, was introduced in order to overcome the limitations of corticotomy. The piezocision procedure combines mucosae and cortical microincisions with the use of piezoelectric tools and bone or soft tissue grafts, through a tunneling.

The piezocision techniques, although minimally invasive, do not however allow accurate control of the piezoelectric insert. In fact, the latter penetrates through the soft tissues which prevent the visual check of the progression of the insert itself. Thus, piezocision is an extremely operator-dependent technique which does not in any case ensure a certain result and which puts the operator and patient at high risk of impacting the roots of the nearby dental elements.

Computer-aided piezocision procedures, named computer-guided piezocision procedures, were implemented in order to prevent the risks of piezocision. Computer-guided piezocision is a technique which allows to plan the surgery in the minimum details by using three-dimensional radiology and complex programming software. Based on volumetric radiographic investigations, in fact the doctor can plan in a precise way, through dedicated software, where to make the incisions of the mucosa through the processing of three-dimensional models. Said computer-guided piezocision procedures comprise the implementation of surgical guides to be used as visual indications for making incisions on the mucosa of the patient at precise points.

An example of surgical guide made for computer-guided piezocision is the surgical guide made by computer-aided design and manufacturing (CAD/CAM) and 3D printed.

The CAD/CAM surgical guide has grooves, named guide tracks, which are used to first guide the scalpel blade (muco-periosteal incision) and then the piezoelectric blade along the cortex (bone incision limited to the cortex). Said guide tracks are made on the basis of the CT radiographic examination of the subject undergoing piezosurgery and are used as visual indication for making the incisions on the mucosa and cortex of the patient in precise points.

In other words, the guide tracks present on the surgical guide simulate the incisions to be made on the mucosa and cortex of the subject undergoing surgery of this type. By following the guide tracks present on the surgical guide, the doctor will be able to make the incisions on the mucosa of the patient by using the scalpel blade and on the cortical bone by using a piezoelectric handpiece. However, it was observed that the surgical guides conventionally used in piezosurgery do not allow the irrigation of the piezoelectric plate of the piezoelectric handpiece, which is therefore subjected to overheating.

Thus, a disadvantage of the current surgical guides used in piezosurgery operations is represented by the overheating of the piezoelectric plate, which implies a high risk of thermal necrosis of the hard and soft tissues of the patient. The piezoelectric plate allows the cutting of the cortex thanks to its high frequency vibration and requires abundant irrigation with a saline solution such as to prevent its overheating. However, in the currently known surgical guides, the presence of the track and the outer wall of the same guide prevent the irrigation of the piezoelectric plate.

Thus, given the growing demand of corticotomy operations in order to reduce the times of the orthodontic treatments, there is a growing need to provide a device, such as a surgical guide for surgical piezocision operations, which prevent the overheating of the piezoelectric plate.

It is further necessary to provide a device, such as a surgical guide for computer-guided piezocision, which does not imply the risk of thermal necrosis of the tissues of the patient subjected to the piezocision surgery.

OBJECTS OF THE INVENTION

Object of the invention is to provide a surgical device for computer-guided piezocision which acts as a model of the incisions to be made on the mucosa of the patient.

Further object of the present invention is to provide a surgical device such as a surgical guide for computer-guided piezocision.

Still object of the present invention is to provide a surgical device for computer-guided piezocision which prevents the overheating of the piezoelectric plate.

Still object of the present invention is to provide a surgical device for computer-guided piezocision which does not involve the thermal necrosis of the tissues of the patient subjected to piezocision procedure.

Further object of the present invention is to provide a piezocision procedure which does not involve the thermal necrosis of the tissues of the patient subjected to a piezocision procedure.

DESCRIPTION OF THE INVENTION

The objects set forth above are reached through the object of the present invention, in order words through a surgical device having a structure provided with a plurality of openings, said device comprising at least one first surface complementary to at least one organ of the subject subjected to surgery, and a second surface opposite the first surface.

The surgical device of the invention comprises at least one first surface complementary to at least one organ of the subject subjected to surgery, and a second surface not in contact with said organ of the subject subjected to surgery. According to a preferred embodiment, said first surface is a contact surface complementary to an upper or lower dental arch of the subject subjected to surgery and said second surface is an outer surface not in contact with said dental arch of the subject subjected to surgery.

In other words, according to the invention, the contact surface of the surgical device is able to be adapted to the upper or lower dental arch of the patient subjected to surgery. According to the invention, the second surface is opposite the first surface.

The surgical device of the invention is used as surgical guide in odontostomatological surgery, preferably in piezocision, even more preferably in computer-guided piezocision.

In the present invention, odontostomatological surgery denotes a medical-surgical specialty which allows the correction of a broad spectrum of deformities or abnormalities of the dental arches and teeth. Odontostomatological surgery operations are for example corticotomy and piezocision. Corticotomy is a surgical technique which provides for the implementation of point-like perforations or linear incisions at the level of the cortex of the alveolar bone tissue in order to speed up and make more stable the orthodontic movement. This technique has reduced risks and a minimum rate of complications, but is characterized by significant post-operative discomfort. Piezocision was introduced to overcome the limitations of corticotomy.

In the present invention, "piezocision" denotes a corticotomy technique which is carried out with linear incisions of the mucosa, at the inter-radicular level, which allow access to the cortical bone without raising flaps of mucosa.

With piezocision, the aggressiveness of the corticotomy procedure is reduced, but the visibility of the operating field is also reduced and, thus, the risks of damages to the concerned anatomical structures increase during procedure.

Thus, the present invention solves the technical problem of the reduced visibility of the operating field during the piezocision operations and the technical problem of the overheating of the piezoelectric plate, which is common in known surgical guides.

The surgical device of the invention is a surgical guide, preferably a surgical guide for computer-guided piezocision.

In the present invention, "computer-guided piezocision" denotes a particular surgical technique of piezocision, which uses surgical guides designed with the aid of the computer (designed in CAD) and printed with a 3D printer.

Advantageously, the surgical device of the invention is provided with a structure equipped with a plurality of openings. Said openings can have a square, rectangular, circular, triangular shape and a surface area ranging from $0.005$ cm$^2$ to $1.125$ cm$^2$, preferably from $0.125$ cm$^2$ to $1$ cm$^2$, even more preferably of $0.125$ cm$^2$. In a further embodiment, the device of the invention can have a structure having a combination of said shapes. In other words, according to said embodiment, a plurality of square-shaped openings, a plurality of rectangular-shaped openings, a plurality of circular-shaped openings, a plurality of triangular-shaped openings can be simultaneously present on the device of the invention.

According to the invention, the surgical device comprises from 100 to 800 openings, preferably from 200 to 700 openings, even more preferably from 300 to 600 openings.

According to a preferred embodiment, the openings on the surgical device of the invention have triangular shape, preferably isosceles triangle, even more preferably equilateral triangle.

According to a particularly preferred embodiment, the triangle forming the opening on the surgical device of the invention has a height ranging from 0.1 cm to 1.5 cm, preferably from 0.5 cm and 1 cm, even more preferably of 0.5 cm and a base ranging from 0.1 cm to 1.5 cm, preferably from 0.5 cm to 1 cm, even more preferably of 0.5 cm. Said openings having triangular shape can have a surface area ranging from $0.005$ cm$^2$ to $1.125$ cm$^2$, preferably from $0.125$ cm$^2$ to $1$ cm$^2$, even more preferably of $0.125$ cm$^2$.

According to a particularly preferred embodiment, the surgical device of the invention has a net-like structure. Advantageously, the net-like structure comprising a plurality of openings of the surgical device according to the invention allows to prevent the overheating of the piezoelectric plate, thus reducing and eliminating the risk of thermal necrosis of the hard and soft tissues of the patient.

In the present invention, the term "patient" denotes the subject subjected to surgery, in particular to a computer-guided piezocision operation.

Advantageously, the presence of a plurality of openings on the device of the invention prevents the overheating of the piezoelectric plate during piezocision operations and allows the irrigation thereof, preferably with a saline solution.

According to the invention, the openings on the device of the invention are 20% to 40% of the surface of the device of the invention, preferably 30% of the surface of the device of the invention.

The net-like structure comprises openings according to the invention, and can further comprise tracks (or guide grooves) for guiding the piezoelectric plate. The number of said tracks (or guide grooves) ranges from 1 to a maximum of 15, considering all the possible interdental spaces.

According to the invention, the structure can have, in combination with said tracks or as an alternative thereto, holes of circular shape that are characterized by a greater surface area with respect to the surface area of the openings on the device of the invention.

Said guide holes can be located along the entire perimeter of the dental arch and are used for the possible insertion of osseointegrated dental implants.

Always according to the invention, the openings can cross the first surface and the second surface on the device of the invention. Likewise, the tracks (or guide grooves) can cross the first surface and the second surface on the device of the invention.

The surgical device according to the invention has the shape of a dental arch. In fact, it has a shape complementary to that of the teeth of the upper or lower dental arch to be subjected to piezocision surgery, preferably computer-guided piezocision. Thus, the device according to the invention comprises the dimensions of the lower or upper arch of the subject subjected to surgical treatment. The device of the invention is characterized by variable measures depending on the dental arches, but has a thickness of at least 2 mm to prevent the risk of fracture.

The surgical device according to the invention is preferably made of resin.

The surgical device can further comprise anchoring elements, preferably elements for anchoring to the teeth. Advantageously, the surgical device of the invention can be used as surgical guide in an orthodontic treatment method which comprises a piezocision procedure, preferably computer-guided piezocision.

According to a particularly preferred embodiment, the device of the invention has a plurality of guide grooves (or tracks) having the function of guiding the incisions of the mucosa of the subject subjected to surgery. In said embodiment, the surgical device has a maximum number of 15 guide grooves, such number anyhow being variable depending on the clinical requirements (teeth to be moved) and interdental spaces available (if the roots of two teeth are too close, a cut between these two teeth cannot be envisaged).

Said guide grooves present on the device of the invention also act as visual indications (not only visual, the grooves prevent the operator from deviating from the predetermined path) for the doctor, who will be able to make piezocisions in precise points on the mucosa of the subject undergoing surgery, by first inserting the scalpel and then the piezoelectric tool into the guide grooves. This way, the present invention solves the technical problem of the impossibility, for the operator, to assess the presence of anatomical limiters represented by the roots of the teeth and by the presence of neurological structures such as the emergence of the mental nerve and the presence of anatomical cavities, such as the nasal ones and the maxillary sinuses.

Said guide grooves can have a width proportionate to the thickness of the piezoelectric insert (0.55 mm). Advantageously, the guide grooves present on the device of the invention have a width ranging from 1-3 mm and allow the piezoelectric plate to vibrate without deviating in a mid-distal direction. The length of the guide grooves is variable, but in the design step, the length of the guide grooves must extend at least 2 mm beyond the dental apex, such as to obtain an effective acceleration of the orthodontic movement.

The depth of the guide grooves represents a reference for the deepening of the piezoelectric plate, which must penetrate in depth up to 10 mm and no more.

According to an embodiment, the guide grooves on the surgical device are virtually designed on the basis of the radiographic examination, computed tomography (CT), of the patient subjected to surgery. Advantageously, the surgical device according to the invention is a customized device made on the basis of the results of the CT radiographic examination.

In fact, after having subjected the patient to a cone-beam CT examination, it is possible to virtually design the piezocision cuts. Thus, said virtually designed piezocision cuts correspond to the guide grooves made on the device according to the invention.

The surgical device according to the invention is made by computer-aided design (CAD) and computer-aided manufacturing (CAM). Thus, the surgical device of the invention is a CAD/CAM device.

The method of producing the surgical device according to the invention provides to obtain a virtual 3D model. The piezocision cuts are inserted into the virtual 3D model such as to form a virtual 3D model of the surgical device according to the invention. At this point, the virtual 3D model is printed by a 3D printer to obtain the surgical device according to the invention. Said device is customized and comprises guide grooves which act as a guide for the incisions on the subject subjected to surgery, preferably piezosurgery.

The method of producing the surgical device according to the invention comprises the steps of:
  a) obtaining a 3D image of the dental arches and vestibular fornix of the patient after having taken an impression, thus obtaining a first file (advantageously obtained from the optical scan of a plaster model of the dental arches, obtained from an impression extending as much as possible into the vestibular fornix), as a file.stl;
  b) subjecting the patient, who interposes a radiological fork for cone beam computed tomography (CT) between the teeth, thus obtaining a second maxillary file such as a file.stl wherein the teeth and maxillary bones are visible;
  c) overlapping said first file (file.stl) and said second file (file.stl);
  d) creating a virtual 3D model of the device of the invention after having overlapped said first and second files (file.stl);
  e) drawing a structure provided with a plurality of openings and a plurality of guide grooves corresponding to the piezocision cuts, on the virtual 3D model of the overlapping of the plaster model and CT images;
  f) printing said virtual 3D model, thus obtaining a stereolithographic surgical template with a net-like structure representing the device according to the invention.

According to the present invention, said first file is advantageously obtained from the optical scan of a plaster model of the dental arches, which is obtained from an impression extending as much as possible into the vestibular fornix.

Always according to the present invention, according to step c), said overlapping occurs thanks to the fork interposed between the dental arches (the fork is interposed between the arches when performing the CT and is interposed between the plaster models obtained from the impressions of the dental arches).

The 3D image of the teeth and vestibular fornix is obtained from the optical scan of the plaster model obtained from the hyperextended impression of the dental arch. Thus, the method of producing the device according to the invention can comprise, upstream of step a), a step a') of obtaining an impression of the dental arches and vestibular fornix. Silicone materials, such as for example polyvinyl siloxane, can be used for making the impression of the dental arches and vestibular fornix. The impression of the vestibular fornix and teeth is obtained by using known techniques. The step a) is obtained by using an optical scanner. For the 3D imaging of the maxillary bones and teeth according to step b) of the method, the patient must be subjected to cone-beam computed tomography (CBCT) with the radiological fork positioned intra-orally.

In step d), the virtual 3D model of the surgical device according to the invention is drawn in CAD by overlapping said first file of the model of the dental arches and vestibular fornix in a) with said second file of the maxillary bone and teeth (i.e. of the hard structures) according to step b).

In other words, the impression of the teeth and vestibular fornix is used to determine the position of the soft structures (mucosa and gum), whereas the CT is used to determine the position of the anatomical limiters not visible to the operator (roots and nerves/bone ducts containing nerves, or bone cavities such as maxillary sinuses/nasal cavities). The overlapping is done thanks to the presence of the teeth (indeed thanks to the fork interposed between the teeth), which are visible on both files.

The method of making the surgical device according to the invention comprises the use of different software. For example, it is possible to virtually design the piezocision cuts to be inserted on the virtual 3D model of the surgical template by using dedicated software, such as for example Cortex, Media Lab (Milan). A CAD program allows to draw the rectangular parallelepipeds, which correspond to the guide grooves of the step e) of the method, said rectangular parallelepipeds being drawn such as not to interfere with the anatomical limiters of the roots of the teeth. The step f) of the method is implemented by 3D printers (any 3D printer can be used).

Advantageously, said embodiment of the surgical device of the invention comprising guide grooves for piezocision cuts can be used as a surgical guide in an orthodontic treatment method which comprises a piezocision procedure, preferably computer-guided piezocision. In fact, advantageously, the piezocision procedure can reduce the times of the orthodontic treatment. Thus, the orthodontic treatment method by computer-guided piezocision comprises the implementation of the surgical device according to the method of producing said device described above and the computer-guided piezocision operation. According to the orthodontic treatment method by computer-guided piezocision, the patient subjected to surgery is operated with the surgical guide according to the invention. Thus, said surgical guide will be in the mouth of the patient subjected to computer-guided piezocision procedure. The surgical guide is adhered to the teeth and to part of the gums of the patient.

The orthodontic treatment method by computer-guided piezocision through the surgical device of the invention comprises the production of the surgical device of the invention according to steps a) to f) of the method of producing the device and the further steps of:

g) inserting the surgical guide into the mouth of the patient by anchoring it to the teeth of the dental arch subjected to the operation h) carrying out the surgery.

The computer-guided piezocision procedure by the device of the invention used as a surgical guide can be carried out very quickly, for example in 30 minutes for a dental arch.

The step h) of the orthodontic treatment method by computer-guided piezocision comprises the initial incision on the buccal mucosa of the patient and subsequent linear incisions on the cortical bone by using a piezoelectric plate.

Said piezoelectric plate can be, for example, inserted through the openings on the device of the invention and can be irrigated with a saline solution. Thus, thanks to the surgical device of the invention as a surgical guide, the path of the piezoelectric plate will be guided and the same plate will no longer overheat and will not damage the hard and soft tissues of the patient. Thus, the surgical device of the invention, used as a surgical guide, increases the safety of the piezocision surgeries.

At the end of the computer-guided piezocision operation by the surgical device of the invention, it is possible to treat the patient with dental braces, such as for example fixed dental braces and movable dental braces.

In the present invention, "fixed orthodontic brace" denotes a device adapted to correct the position of the teeth, which is positioned onto the teeth of the user in a non-removable way, except through orthodontic tools of specialized use.

In the present invention, "movable orthodontic brace" denotes a device adapted to correct the position of the teeth and which is used by the user in an easily removable way according to need.

At the end of the computer-guided piezocision operation through the surgical device of the invention, the patient is preferably treated with removable dental braces, such as for example orthodontic aligners. The orthodontic aligners are clear removable braces which have the shape of the dental arches of the subject subjected to treatment and which are used in the so-named "invisible orthodontics," since they are transparent devices.

Object of the invention is also the use of the surgical device according to the invention in odontostomatological surgery. According to the invention, said device is used as surgical guide in corticotomy surgeries, preferably in piezocision surgeries, still more preferably in computer-guided piezocision procedures. In fact, the use of the device of the invention as surgical guide in computer-guided piezocision procedures allows to significantly reduce the risks of damages to the anatomical structures surrounding the site of surgery, also when the dental elements are crowded and/or rotated.

It was in fact observed that the post-operative discomfort of patients undergoing piezocision by using the device according to the invention as surgical guide was less than that experienced by patients operated by using a surgical guide having uniform structure without openings, conventionally used. In fact, said conventionally used surgical guide having uniform structure without openings led to thermal necrosis of the hard and soft tissues of the patients treated. The patients subjected to piezocision by using the surgical guide of the invention had a moderately mild post-operative discomfort, characterized by the presence of minimal swelling limited to 3 days following the operation and no pain.

DETAILED DESCRIPTION OF THE FIGURES

Figure 1:
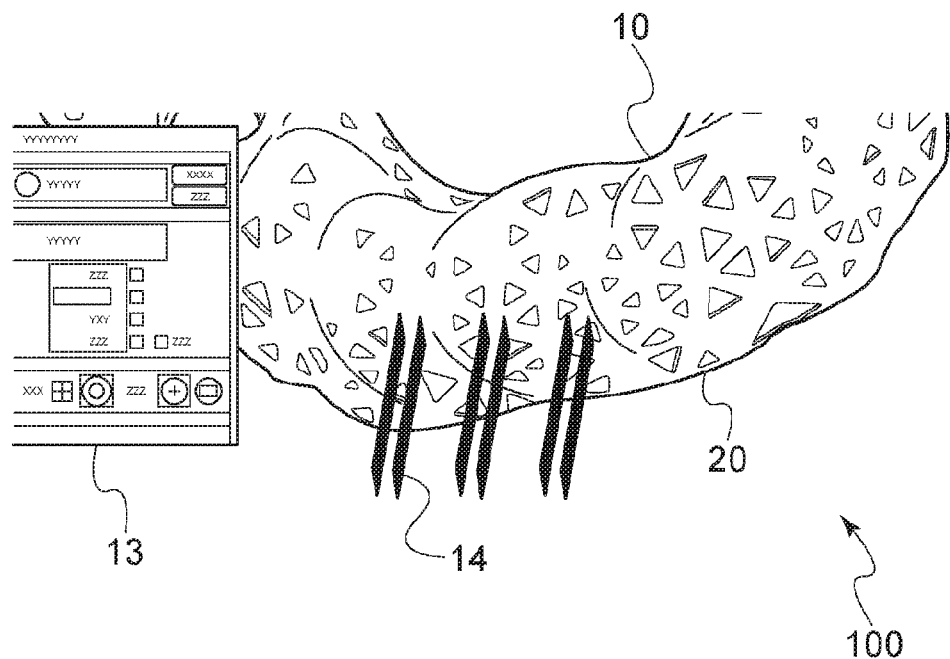
FIGS. 1 and 2 depict the surgical device of the invention.

FIG. 1 depicts the surgical device 100 according to the computer-aided design (CAD/CAM), said surgical device 100 having a structure provided with a plurality of openings 11 and comprising a first surface 10 and a second surface 20, said second surface being opposite the first surface 10. The first surface 10 is a contact surface complementary to a dental arch of the subject subjected to surgery and is in direct contact with the teeth of the subject subjected to surgery and partially with the gums of said subject. The second surface 20 is an outer surface not in contact with said dental arch of the subject subjected to surgery. The openings 11 on the device 100 cross the second surface 20 and the first surface 10. The device 100 in FIG. 1 has triangular-shaped openings 11. The surgical device 100 has guide grooves 14, said guide grooves being guide lines for the piezocision cuts. A screenshot of the program used for the CAD/CAM design (13) of the surgical device 100 is shown in FIG. 1.

Figure 2:
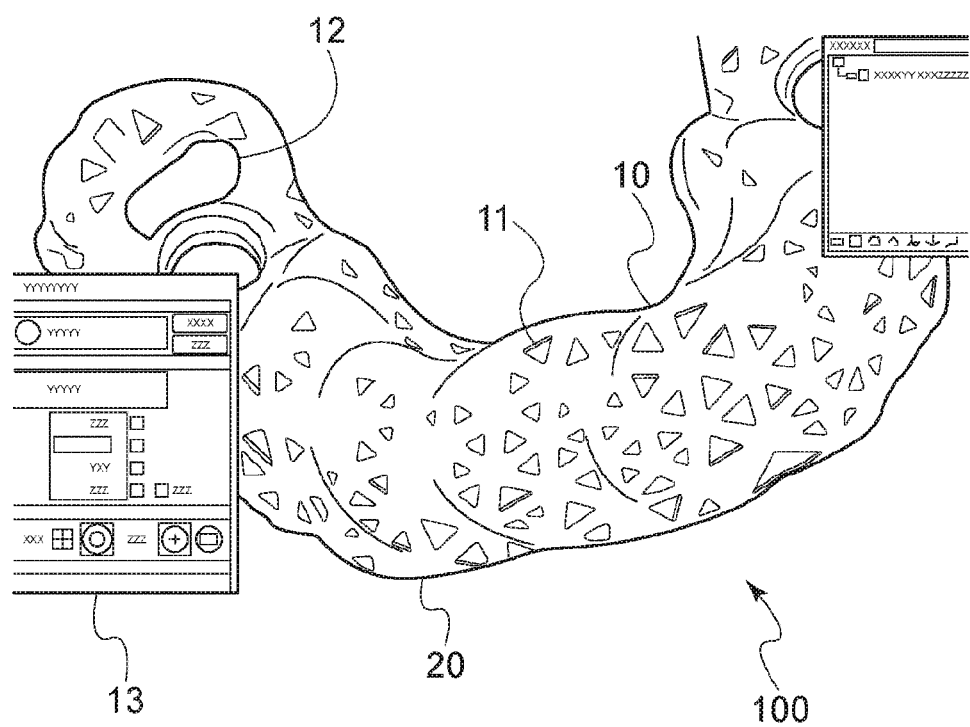

FIG. 2 depicts the surgical device 100 according to the computer-aided design (CAD/CAM), said surgical device 100 having a structure provided with a plurality of openings 11 and holes 12 and comprising a first surface 10 and a second surface 20, said second surface being opposite the first surface 10. The first surface 10 is a contact surface complementary to a dental arch of the subject subjected to surgery and is in direct contact with the teeth of the subject subjected to surgery and partially with the gums of said subject. The second surface 20 is an outer surface not in contact with said dental arch of the subject subjected to surgery. The openings 11 on the device 100 cross the second surface 20 and the first surface 10. Likewise, the holes 12 on the device 100 cross the second surface 20 and the first surface 10. The holes 12 are located to the left and right sides of the device 100. The device 100 in FIG. 2 has triangular-shaped openings 11 and circular-shaped holes 12. The surgical device 100 can optionally have a plurality of guide grooves (not shown in the Figure), said guide grooves being guide lines for the piezocision cuts. Two screenshots of the program used for the CAD/CAM design (13) of the surgical device 100 are shown in FIG. 2.

EXPERIMENTAL SECTION

Example 1: Design and Printing of a Surgical Guide According to the Invention The surgical guide of the invention, having a structure provided with a plurality of openings and a plurality of guide grooves (or tracks) and comprising a first surface complementary to an upper or lower dental arch of a subject to be subjected to computer-guided piezocision surgery, was made by computer aided design and manufacturing (CAD/CAM) and printed by a 3D printer.

The impression of the vestibular fornix of a subject to be subjected to computer-guided piezocision surgery was taken to make the surgical guide according to the invention. The impression was taken by using known techniques. At this point, a three-dimensional model of the impression was acquired by using a 3D scanner (Easy Optical 3D scanner; Open Technologies, Rezzato) and the images were saved in a stereolithographic file format (STL file).

The patient was subjected to a cone-beam computed tomography (CBCT) by wearing a radiological fork to overlap the stl files of the optical scan of the plaster model of the dental arches and the stl file of the maxillary bones and teeth.

At this point, digital DICOM images were acquired by using the Cortex, Media Lab (Milan) software and the images of the jaw were converted into a 3D model and also saved as an STL file. The STL file of the vestibular fornix and the STL file of the jaw were overlapped and, by using the Cortex, Media Lab (Milan) 3D design software, guide grooves corresponding to the piezocision cuts were positioned in the virtual model.

Openings and holes were included on the virtual model of the surgical guide by using the Cortex software. The 3D model of the device of the invention was then printed with any 3D printer.

Example 2: Use of the Device of the Invention as Surgical Guide in Computer-Guided Piezocision Six patients who were to be subjected to computer-guided piezocision surgery were divided into two groups of three. The first group was subjected to the piezocision operation with conventionally used surgical guides (having a uniform structure), whereas the second group was subjected to the piezocision operation with surgical guides according to the invention, which were made according to the method of Example 1.

The patients subjected to piezocision by using the surgical guide of the invention had a moderately mild post-operative discomfort, characterized by minimal swelling limited to 3 days following the operation and no pain.

The post-operative discomfort of the patients subjected to a piezocision by using the surgical guide having a net-like structure provided with a plurality of openings and holes was less than that experienced by the patients operated by using a conventionally used surgical guide.

The conventionally used surgical guide does not comprise openings and holes and led to thermal necrosis of the hard and soft tissues of the patients treated.

The invention claimed is:

1. A surgical device (100) having a structure provided with a plurality of openings (11) and forming a net-like structure, said device comprising at least one first surface (10) complementary to a dental arch of a subject subjected to surgery, and a second surface (20) opposite the first surface (10), wherein said surgical device is adapted to surround and have the same shape as the teeth of the dental arch of the subject, and the first surface is configured to be in direct contact with the teeth of said dental arch of said subject and partially in contact with the gums of said subject,
    said surgical device further comprising a plurality of guide grooves or tracks (14), wherein said guide grooves or tracks (14) are guide lines adapted to guide a piezoelectric instrument for making piezocision cuts, and
    at least two holes (12) disposed on a perimeter of said surgical device, said at least two holes having a greater surface area than a surface area of said openings and adapted to have dental implants inserted therein.

2. The surgical device (100) according to claim 1, wherein said net-like structure is defined by said plurality of openings and said plurality of openings (11) comprise irregularly spaced and differently sized openings.

3. The surgical device (100) according to claim 1, wherein said plurality of openings (11) have a surface area ranging from 0.005 cm$^2$ to 1.125 cm$^2$, and said at least two holes (12) are disposed at opposed ends of said surgical device.

4. A method comprising performing oral and dental surgery operations using the surgical device (100) according to claim 1 as a surgical guide.

5. The method according to claim 4, wherein said oral and dental surgery operations comprise piezocision operations and further comprising anchoring said surgical device to the subject's teeth.

6. The method according to claim 5, wherein said piezocision operations are computer-guided piezocision operations.

7. The method according to claim 4, wherein said plurality of openings (11) comprise irregularly spaced and differently sized openings.

8. The method according to claim 4, wherein said plurality of openings (11) comprise irregularly spaced and differently sized triangles.

9. The method according to claim 4, further comprising irrigating with a saline solution through said openings.

10. The method according to claim 4, wherein said method comprises:
adhering said first surface (10) directly to the teeth and to part of the gums of the subject; and
performing piezosurgery by cutting said subject with a piezoelectric plate using said guide grooves or tracks (14) formed in said surgical guide (10), to guide said piezoelectric plate.

11. The method according to claim 10, wherein said piezosurgery comprises corticotomy.

12. The method according to claim 10, wherein said cutting comprises making incisions on the mucosa and cortex of the subject.

13. The method according to claim 4, wherein said guide grooves or tracks are formed based upon a CT radiographic examination of the subject undergoing piezosurgery.

14. The surgical device (100) according to claim 1, wherein said surgical device comprises resin and further comprising anchoring elements.

15. The surgical device (100) according to claim 1, wherein said plurality of openings comprise polygons and said net-like structure is defined by said plurality of polygons.

16. The surgical device (100) according to claim 15, wherein said plurality of polygons comprise a plurality of different sized triangles.

17. The surgical device (100) according to claim 15, wherein said plurality of polygons comprise irregularly arranged triangles.

* * * * *